June 20, 1950
E. L. FROST
2,511,976
SUBMERGED MELT ELECTRIC WELDING
Filed March 24, 1949
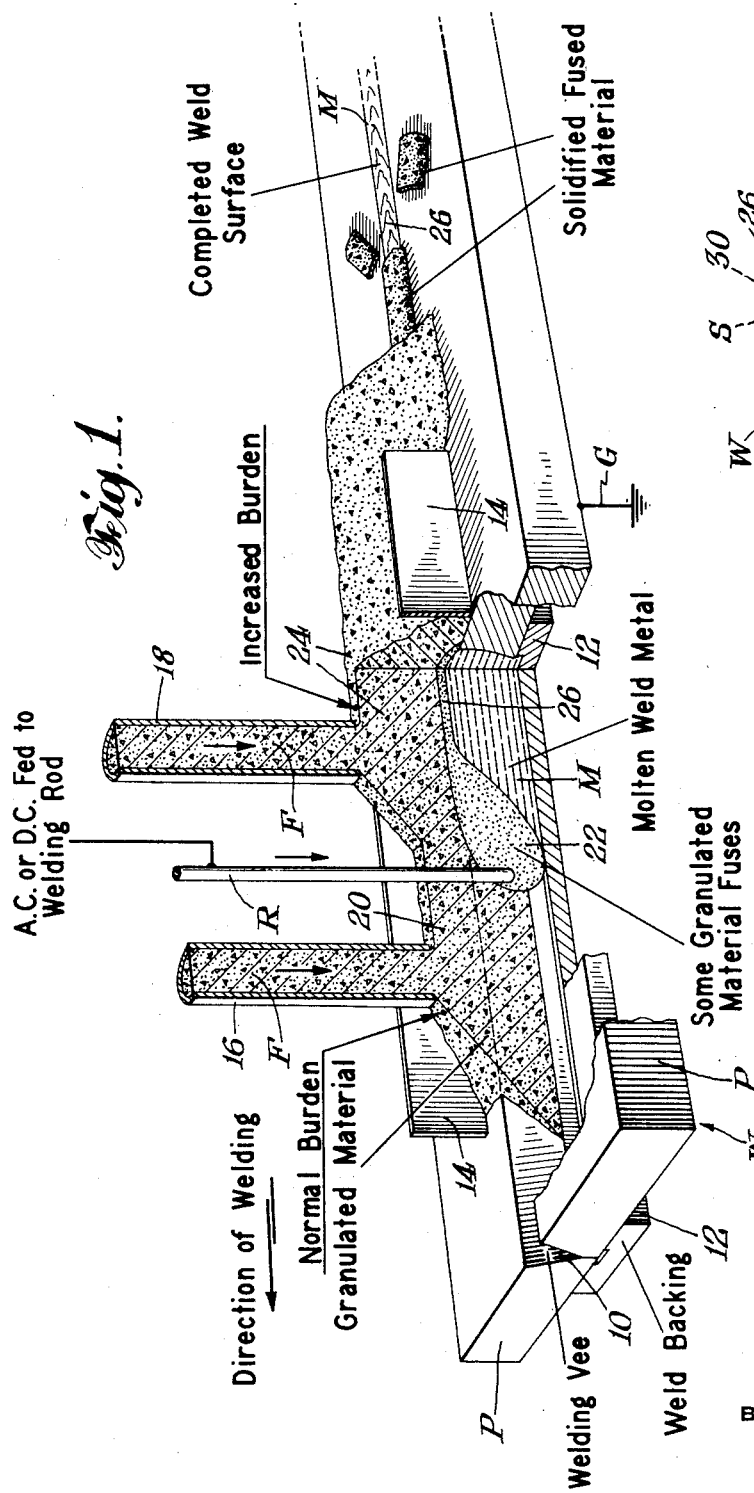
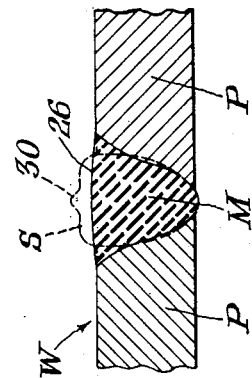
INVENTOR
EDWARD L. FROST
BY
D.C.Harrison
ATTORNEY Patented June 20, 1950

2,511,976

UNITED STATES PATENT OFFICE 2,511,976

SUBMERGED MELT ELECTRIC WELDING

Edward L. Frost, Snyder, N. Y., assignor to The Linde Air Products Company, a corporation of Ohio Application March 24, 1949, Serial No. 83,126

4 Claims. (Cl. 219—10)

This invention relates to improvements in submerged melt electric welding of the type disclosed in Patent 2,043,960, in which a granular flux burden is applied in front of the welding rod or electrode.

The production of a smooth, uniform weld surface is desirable, but in this type of welding under some conditions the resulting weld has a rough, grooved surface. Also, when the welding current is high, i. e., of the order of 2000 amperes, such welding is subject to the undesirable formation of a heavily rippled weld surface, as well as a heavy centerline ridge along the top of the weld.

The main object of this invention, therefore, is to provide an improved method of submerged melt electric welding which overcomes such difficulties and results in a smooth and uniform weld surface even when the welding current is high. Other objects will be apparent to those skilled in the art from the following description.

A very great improvement in the shape and appearance of the weld is obtained, according to the present invention, by progressively applying behind or trailing the welding rod or electrode, another granular flux burden. The second or auxiliary burden effectively seals off any fumaroles which may tend to form in the fused and/or granular flux composition, and hence prevents "blowback" or escape of gas from the welding "chamber" along the weld and fused melt interface during the production of the weld, the gas being forced to escape around the electrode.

More particularly there is provided, according to the invention, an improved submerged melt electric welding process which comprises laying down a layer of fine granular flux along a lineal zone on a metal workpiece, feeding a fusible metal electrode through such flux toward such workpiece and moving the electrode in the direction of such zone, supplying electric current of sufficient value to fuse the granular flux under the end of such electrode and fuse the electrode as it is fed toward the workpiece and also fuse the adjacent metal of such workpiece, and laying down another layer of granular flux directly behind the electrode and on top of the first layer of flux above the so fused material for the purpose of preventing gas resulting from the welding operation from flowing backwardly thereof and marring the surface of the weld. A very smooth surfaced weld results.

In the drawing:

Fig. 1 is a perspective view of a submerged melt electric welding set-up illustrating the invention; and Fig. 2 is a cross-sectional view of the resulting weld, a submerged-melt weld which was made prior to the invention being shown by a broken line.

As shown in the drawing, a workpiece W of metal to be welded is provided with a V-groove or seam 10 between plates P, P having their edges suitably beveled for this purpose. The plates are supported by a metal chill bar 12 located under the V-groove 10. The workpiece is electrically grounded at G so that the welding current from a suitable source of current (A. C. or D. C.) flows through the workpiece and a welding rod R of fusible metal which is fed downwardly during the progress of the welding operation. The rod R is, at the same time, moved in the direction of the groove 10 along with parallel side walls 14, 14 and two granular flux feed pipes 16 and 18, one of which is located in front and the other behind the rod R. Thus, granular flux F supplied by the pipe 16 provides a normal burden 20 of flux in front and above the welding zone 22, while the pipe 18 supplies an auxiliary or second burden 24 of flux directly behind such zone 22.

One of the most important factors for the production of a smooth submerged melt weld is the manner in which gas is released from the welding zone. This is particularly true for welds made with high amperage welding currents. A gentle fluffing of melt directly around the tip of the rod R is necessary in order to permit uniform gas release from this zone. Therefore, the pipe 18 is located so that the flux therefrom does not flow around the electrode R.

In considering the operation of the illustrated set-up, a normal 1⅕ inch deep melt burden 20 consisting of 20 mesh by dust (Tyler Scale) size flux was first applied. A second burden 24 of flux was added approximately 3 inches behind the electrode or rod R, which increased the total burden to a depth of approximately 3 to 4 inches. This added granular material was not fused, but sealed off any channels in the initial burden 20 and prevented "blowback" of gas along the weld surface 26. It forced any gas release to take place immediately around the welding electrode R. This method produced a weld M having an exceptionally smooth weld surface 26 of uniform width.

Exceptionally good welds are produced according to the invention by the use of granular flux of fine particle sizes throughout the entire depth of the melt burden in order to permit uniform release of gases from the welding zone, and by the additional burden to seal off any "blowbacks" which might occur with flux of poor sizing characteristics.

Uniform gas release from the welding "chamber" formed by the fused metal M and fused flux under the unfused flux, is very important particularly at high-amperage levels, in order to produce a smooth weld surface 26. The fluffing of fine particles of flux in the immediate zone of the tip of the welding rod R provides an indication of proper gas release. If such phenomenon does not take place and gases are released through channels or fumaroles in the fused and granular melt for a considerable length of time, a rough and heavily rippled weld surface S is produced, as shown by the broken line in Fig. 2. Frequently, a heavy centerline ridge 30 also forms on the surface of the weld prior to the present invention.

The double flux burden technique of the present invention prevents any such undesirable channeling from taking place. The total flux burden seals off any fumaroles which are formed and forces the gas release to take place in the desired immediate zone of the welding rod R. Actual welds have been made with this method at welding current values of the order of 1800–2100 amperes. The resultant weld surfaces are relatively free from ripples and exhibit uniform and even weld edges, with no undercutting.

This method produces unexpectedly great improvement in smoothness and shape of the weld surface and in uniformity along the fused edges of the weld. The granular material remaining after welding is reclaimable and reusable. The degree of smoothness of the weld and distribution of pressure across the welding puddle are a function of the extent of the depth of the auxiliary burden. This pressure, due to weight of the auxiliary material, may be applied in any desired manner, without departing from the invention in order to control in other ways the shape or condition of the weld.

I claim:

1. In the art of submerged melt electric welding in which a metal electrode is fed toward and along a metal workpiece and melted and deposited by passing an electric current from such metal electrode to the metal workpiece through a first blanket of flux which is granular and nonconductive when cold, the method of improving the surface appearance of the weld which consists of depositing a substantial amount of additional granular flux on said first blanket directly behind and in closely spaced relation to said moving electrode sufficient in amount to retard the escape of gas along the solidifying metal under the added flux, causing such gas to escape substantially only adjacent the electrode.

2. A submerged melt electric welding process which comprises laying down a first layer of fine particle size-granular flux along a groove to be welded in a metal workpiece, feeding a metal electrode through such flux toward the workpiece and moving such electrode in the direction of such groove, passing electric current from the metal electrode to the metal workpiece through the flux, of sufficient value to fuse the granular flux under the end of such electrode and fuse the electrode as it is fed toward the workpiece and also fuse the adjacent metal of such workpiece, and laying down another layer of granular flux of substantial thickness directly behind and in closely spaced relation to said electrode and on top of the first layer of flux above the so fused material for the purpose of causing gases resulting from the welding operation to be vented substantially only around the electrode, and preventing such gases from flowing backwardly thereof and marring the surface of the weld.

3. In the art of electric welding with an electric welding rod composed of metal which is fed into a layer of granular welding flux on a workpiece composed of metal as the workpiece and rod are moved relatively along a path to be welded and an electric welding current flows from the rod through such flux and to the workpiece, of sufficient value to fuse the metal and the flux in the welding zone, resulting in the forming of a weld under the fused flux, the improvement which consists in depositing a substantial additional burden of granular material on the flux directly behind and in closely spaced relation to the rod to prevent gases from flowing backwardly thereof, but not close enough to cause any interference with fluffing due to gas escape adjacent the rod, as the latter is fed toward the welding zone, for the purpose of controlling the shape and surface condition of the resulting weld.

4. The method of electric welding under granular flux which comprises laying down a first layer of granular welding flux on metal to be welded in front of a welding electrode from which welding current flows to such metal through the flux, as the electrode is moved in the direction of the weld, and laying down a second layer of granular welding flux of substantial thickness on the first layer close behind but spaced from the electrode so that gas backflow is minimized, and fluffing, due to gas escape, is thereby forced to take place around the electrode

EDWARD L. FROST.

REFERENCES CITED

The following references are of record in the file of this patent:

UNITED STATES PATENTS

| Number | Name | Date |
| --- | --- | --- |
| 2,105,079 | Holslag | Jan. 11, 1938 |